(12) United States Patent
Schmitt

(10) Patent No.: US 8,998,254 B2
(45) Date of Patent: Apr. 7, 2015

(54) ROLLOVER PROTECTION DEVICE FOR A MOTOR VEHICLE, AND MOTOR VEHICLE

(71) Applicant: Dr. Ing. h.c. F. Porsche Aktiengesellschaft, Stuttgart (DE)

(72) Inventor: Hans-Juergen Schmitt, Muehlacker (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/445,296

(22) Filed: Jul. 29, 2014

(65) Prior Publication Data

US 2015/0028572 A1    Jan. 29, 2015

(30) Foreign Application Priority Data

Jul. 29, 2013   (DE) .......................... 10 2013 108 100

(51) Int. Cl.
    *B60R 21/13*        (2006.01)
(52) U.S. Cl.
    CPC ........... *B60R 21/13* (2013.01); *B60R 2021/134* (2013.01)
(58) Field of Classification Search
    CPC .............. B60R 21/13; B60R 2021/132; B60R 2021/135; B60R 2021/134
    USPC ......................................................... 280/756
    See application file for complete search history.

(56) References Cited

U.S. PATENT DOCUMENTS

| 7,032,927 | B1* | 4/2006 | Joranlien ........................ 280/756 |
| 7,740,277 | B2  | 6/2010 | Schmitt |
| 7,938,446 | B2* | 5/2011 | Schmitt et al. ................. 280/756 |
| 2009/0085337 | A1* | 4/2009 | Vlahovic et al. ............... 280/756 |

FOREIGN PATENT DOCUMENTS

| DE | 8523831 | 11/1985 |
| EP | 1932728 | 6/2008 |
| FR | 2890018 | 3/2007 |
| GB | 2425093 | 10/2006 |

* cited by examiner

*Primary Examiner* — Ruth Ilan
(74) *Attorney, Agent, or Firm* — Gerald E. Hespos; Michael J. Porco; Matthew T. Hespos

(57) ABSTRACT

Rollover protection device (10) for a motor vehicle has a supporting frame (11) extending in the vehicle transverse direction and rollover protection cassettes (12). Each rollover protection cassette (12) has a rollover body (14) that can be deployed from a housing (13). A connecting profile (15) of the supporting frame (11) extends between the rollover protection cassettes (12). Columns (16) are positioned between lateral ends of the connecting profile (15) of the supporting frame (11) and the housings (13) of the rollover protection cassettes (12). Each of these columns (16) is connected to the housings (13) of the rollover protection cassettes (12) and to the connecting profile (15) of the supporting frame (11). Each column (16) can be connected to a center tunnel of a body shell of the motor vehicle.

7 Claims, 1 Drawing Sheet

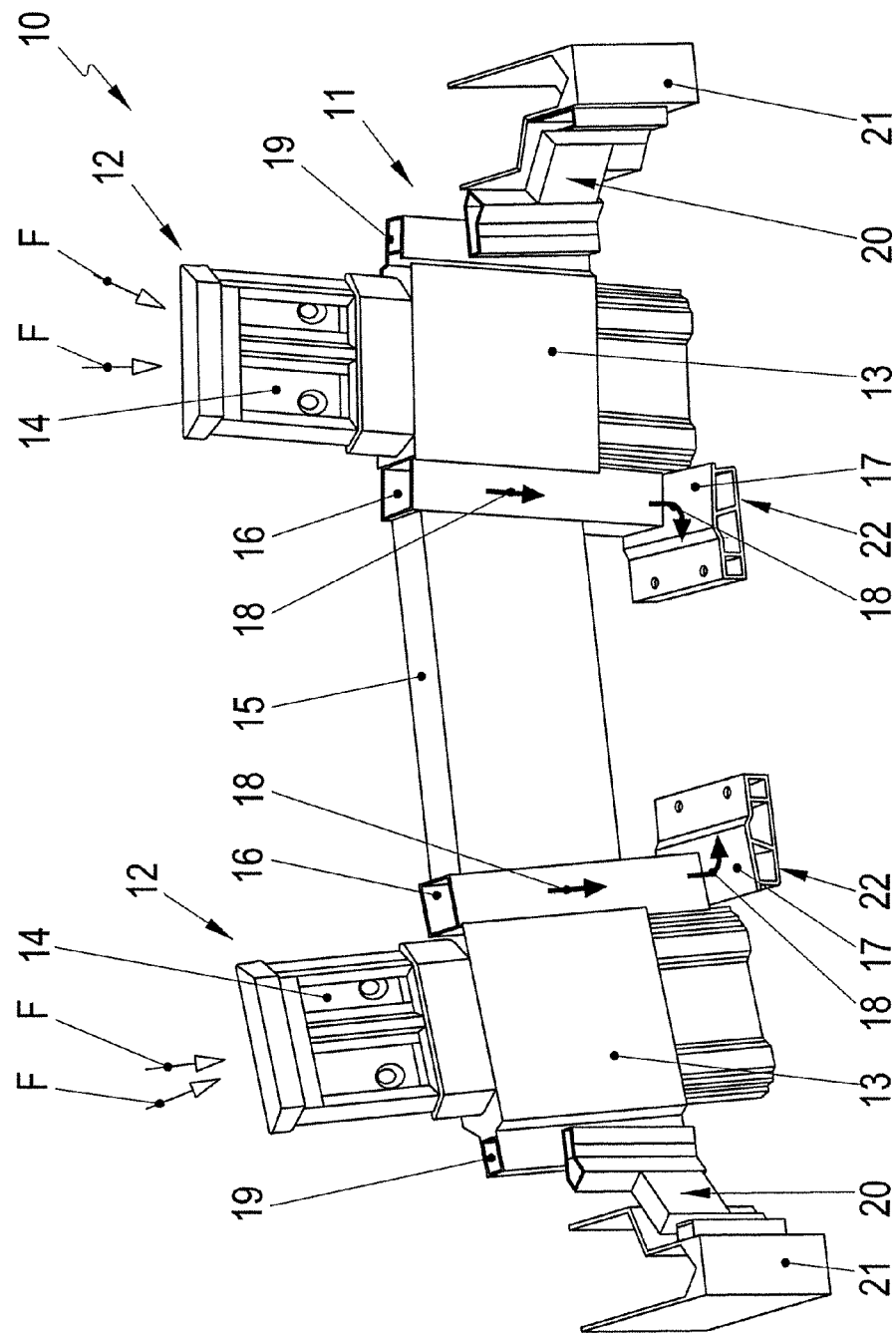

ROLLOVER PROTECTION DEVICE FOR A MOTOR VEHICLE, AND MOTOR VEHICLE

CROSS REFERENCE TO RELATED APPLICATION

This application claims priority under 35 USC 119 to German Patent Appl. No. 10 2013 108 100.2 filed on Jul. 29, 2013, the entire disclosure of which is incorporated herein by reference.

BACKGROUND

1. Field of the Invention

The invention relates to a rollover protection device for a motor vehicle and to a motor vehicle with a rollover protection device.

2. Description of the Related Art

U.S. Pat. No. 7,740,277 discloses a motor vehicle having a rollover protection device arranged behind seats of the motor vehicle. This prior art rollover protection device has a supporting frame extending in the vehicle transverse direction and rollover protection cassettes. Each rollover protection cassette has a rollover body that can be deployed from a housing. A connecting profile of the supporting frame extends between the rollover protection cassettes. The rollover protection device further comprises lateral, upright columns. The side of each column that faces away from the connecting profile engages on the housing of the respective rollover protection cassette and a foot of each column is connected to a vehicle supporting structure. This known rollover protection device further has rearwardly directed support elements supported in the region of rear longitudinal members of the vehicle structure.

The object of the invention is to provide a novel motor vehicle with improved rollover protection and an improved rollover protection device for a motor vehicle.

SUMMARY OF THE INVENTION

According to the invention, columns are positioned between lateral ends of the connecting profile of the supporting frame and the housings of the rollover protection cassettes. Each column is connected to the housings of the rollover protection cassettes and to the connecting profile of the supporting frame. Furthermore, each column can be connected to a center tunnel of a body shell of the motor vehicle. Thus the rollover protection device of the invention is supported on the center tunnel of a body shell of the motor vehicle via columns that are arranged between the housings of the rollover protection cassettes and lateral ends of the connecting profile of the supporting frame. Accordingly, the columns are not fastened to the housing of the rollover protection cassettes in the conventional manner on a side facing away from the connecting profile, but rather on a side facing the connecting profile. As a result, forces acting on the rollover protection device can be dissipated better to the body shell of the motor vehicle. The rollover protection device can thus be configured for other installation space situations.

The columns preferably are profiles with square cross sections. Each column preferably is connected at a first side wall to the housing of the respective rollover protection cassette, at a second side wall to the connecting profile of the supporting frame and at a lower end to the center tunnel of the body shell via a foot. This design allows a structurally simple and effective protection in the event of a rollover.

A section of each foot that faces the respective rollover protection cassette preferably has deformation chambers delimited by obliquely extending partition walls. Thus, the feet that fasten the column sections to the center tunnel of the body shell, can deform as required with the absorption of forces and moments and hence ensure the protective effect of a rollover protection device.

The rollover protection cassettes preferably are connected to B-pillars of the body shell via supports. These forwardly extending supports allow force dissipation to the B-pillars of the body shell.

Preferred developments of the invention will become apparent from the subclaims and the following description. Without being limited thereto, exemplary embodiments of the invention will be explained in more detail by way of the drawing.

BRIEF DESCRIPTION OF THE DRAWINGS

FIG. 1 shows a perspective view of a rollover protection device according to the invention for a motor vehicle.

DETAILED DESCRIPTION OF THE PREFERRED EMBODIMENTS

The invention relates to a rollover protection device for a motor vehicle, in particular a convertible, and to a motor vehicle having such a rollover protection device.

A rollover protection device 10 according to the invention is identified by the numeral 10 in FIG. 1. The rollover protection device 10 has a supporting frame 11 extending in the vehicle transverse direction and rollover protection cassettes 12 fastened to the supporting frame 11.

Each rollover protection cassette 12 has a housing 13 and a rollover body 14 that can be deployed from the housing 13. The supporting frame 11 comprises a connecting profile 15 that extends between the housings 13 of the rollover protection cassettes 12.

Columns 16 are positioned between lateral ends of the connecting profile 15 of the supporting frame 11 and the housings 13 of the rollover protection cassettes 12. Each column 16 extends substantially verticalally and is connected firmly, in particular by welding, to the connecting profile 15 and to the housing 13 of the respective rollover protection cassette 12. Each column 16 also can be connected to a center tunnel (not shown) of the body shell of the motor vehicle for connecting the rollover protection device 10 to the body shell of the motor vehicle. The connection of the columns 16 of the supporting frame 11 to the center tunnel of the motor vehicle preferably is effected via feet 17. Each of the feet 17 preferably is connected firmly by welding to a lower end of one of the columns 16 and can be connected by screwing to the center tunnel of the body shell of the motor vehicle.

The columns 16 that connect the rollover protection device 10 to the center tunnel of the body shell of the motor vehicle are arranged between the housings 13 of the rollover protection cassettes 12 and lateral ends of the connecting profile 15. Thus, forces F that act on the rollover protection device 10 in the event of a rollover can be dissipated better to the body shell of the motor vehicle. As a result, the protective effect of the rollover protection device 10 can be improved with respect to the prior art.

Arrows 18 in FIG. 1 illustrate the dissipation of forces F that act on the rollover protection device 10 in the event of a rollover via the columns 16 and feet 17 to the center tunnel (not shown) of the body shell.

Each column 16 is a profile with square cross section and extends vertically. The housing 13 of each rollover protection cassette 12 is welded firmly on a first or outer side wall of each column 16. An opposite second or inner side wall of the respective column 16 is connected firmly by welding to the connecting profile 15 of the supporting frame 11.

The two columns 16 and the connecting profile 15 preferably are extruded profiles.

Further columns 19 engage on sides of the respective rollover protection cassette 12 facing away from the columns 16 and hence away from the connecting profile 15 of the supporting frame 11. These further columns 19 preferably are separate extruded profiles that are connected firmly to the housing 13, in particular by welding. However, these further columns 19 can be integral constituent part of the housings 13 of the rollover protection cassettes 12.

Forwardly extending supports 20 engage on the further columns 19, and convertible-top bearings 21 connect the ends of the supports 20 that face away from the columns 19 to the B-pillars of the body shell of the motor vehicle. The convertible-top bearings 21 bear a convertible top of a convertible. Depending on the formation of the convertible-top bearings, a direct attachment to the B-pillars may be possible.

Horizontal forces that act in the event of a rollover can be dissipated via the supports 20 in the direction of the B-pillars of the motor vehicle body shell.

As stated above, vertical forces that act in the event of a rollover are dissipated via the columns 16 and the feet 17 toward the center tunnel (not shown) of the motor vehicle body shell. These columns 16 are arranged between the housings 13 of the rollover protection cassettes 12 and lateral ends of the connecting profile 15 of the supporting frame 11. Forces acting substantially horizontally in the event of a rollover are dissipated via the supports 20 toward the B-pillars of the motor vehicle body shell.

In the illustrated embodiment, the feet 17 have deformation chambers 22, in sections that face the housings 13 of the rollover protection cassettes 12. The deformation chambers 22 are delimited by obliquely extending partition walls and can deform in the event of loading or in the event of a rollover and accordingly can absorb forces and moments. As a result, the protective effect of the rollover protection device 10 is improved further. The deformation chambers 22 of the feet 17 that face the rollover protection cassettes 12 may be contoured in a parallelogram-like manner in cross section.

Importantly, the columns 16 that dissipate vertical forces on the rollover bodies 14 in the event of loading in the direction of the body shell of the motor vehicle are arranged between the housings 13 of the respective rollover protection cassettes 12 and lateral ends of the connecting profile 15 of the supporting frame 11 that extends between the rollover protection cassettes 12.

The columns 16 are supported on the center tunnel of the motor vehicle body shell via the feet 17. As a result, forces acting on the rollover bodies 14 of the rollover protection cassettes 12 are dissipated safely and reliably to the center tunnel of the motor vehicle body shell. This force dissipation is improved further when the feet 17 deform.

Horizontal compressive forces and tensile forces that act on the rollover protection device 10 are dissipated via the lateral, forwardly extending supports 20 to the B-pillars of the motor vehicle body shell.

The rollover protection device 10 has a simple structure and effectively dissipates forces on the rollover protection device 10 toward the body shell of the motor vehicle in the event of a rollover. As a result, effective passenger protection is provided.

What is claimed is:

1. A rollover protection device for a motor vehicle, comprising: a supporting frame having a connecting profile extending in a transverse direction on the vehicle, rollover protection cassettes at opposite ends of the connecting profile, each rollover protection cassette having a housing and a rollover body that can be deployed from the housing, columns positioned between lateral ends of the connecting profile of the supporting frame and the housings of the rollover protection cassettes, each of the columns extending substantially vertically, each of the columns having a first side wall connected to the housings of the respective rollover protection cassettes and having a second side wall opposite the first side wall and connected to the connecting profile of the supporting frame, each of the columns further having a foot at a lower end connected to a center tunnel of a body shell of the motor vehicle to introduce main loads during a rollover load into the center tunnel in a z and/or a y direction, each foot having deformation chambers delimited by obliquely extending partition walls.

2. The rollover protection device of claim 1, wherein the deformation chambers of the feet have parallelogram-shaped cross sections.

3. The rollover protection device of claim 1, further comprising supports that connect the rollover protection cassettes to B-pillars of the body shell.

4. The rollover protection device of claim 3, further comprising outer columns positioned between first lateral ends of the supports and the housings of the rollover protection cassettes.

5. The rollover protection device of claim 4, wherein the supports have second lateral ends connected to the respective B-pillar via convertible-top bearings.

6. The rollover protection device of claim 1, wherein the column sections and the connecting profile are extruded profiles.

7. A motor vehicle, comprising: a body shell and a rollover protection device with a supporting frame extending in a vehicle transverse direction and left and right rollover protection cassettes, each rollover protection cassette having a housing and a rollover body that can be deployed from the housing, the supporting frame having a connecting profile extending between the rollover protection cassettes, column sections positioned between lateral ends of the connecting profile of the supporting frame and the housings of the rollover protection cassettes, each of the column sections extending substantially vertically, each of the columns having a first side wall connected to the housings of the respective rollover protection cassettes, and having a second side wall opposite the first side wall and connected to the connecting profile of the supporting frame, each of the columns further having a foot at a lower end connected to a center tunnel of the body shell of the motor vehicle to introduce main loads during a rollover load into the center tunnel in a z and/or a y direction, each foot having deformation chambers delimited by obliquely extending partition walls.

* * * * *